(12) United States Patent
Bodenstab et al.

(10) Patent No.: US 11,074,908 B2
(45) Date of Patent: Jul. 27, 2021

(54) SYSTEM AND METHOD FOR ALIGNING ASR MODEL WEIGHTS WITH NLU CONCEPTS

(71) Applicant: Nuance Communications, Inc., Burlington, MA (US)

(72) Inventors: Nathan Bodenstab, Houlton, ME (US); Matt Hohensee, Seattle, WA (US); Dermot Connolly, Aachen (DE); Kenneth Smith, London (GB); Vittorio Manzone, Turin (IT)

(73) Assignee: Nuance Communications, Inc., Burlington, MA (US)

( * ) Notice: Subject to any disclaimer, the term of this patent is extended or adjusted under 35 U.S.C. 154(b) by 175 days.

(21) Appl. No.: 16/441,691

(22) Filed: Jun. 14, 2019

(65) Prior Publication Data

US 2020/0312311 A1 Oct. 1, 2020

Related U.S. Application Data

(60) Provisional application No. 62/826,426, filed on Mar. 29, 2019.

(51) Int. Cl.
*G10L 15/00* (2013.01)
*G10L 15/18* (2013.01)

(52) U.S. Cl.
CPC .............. *G10L 15/1822* (2013.01)

(58) Field of Classification Search
USPC .................. 704/231–257, 270–275
See application file for complete search history.

(56) References Cited

U.S. PATENT DOCUMENTS

| | | | |
|---|---|---|---|
| 2002/0188446 A1* | 12/2002 | Gao ....................... | G06F 40/216 704/240 |
| 2007/0219798 A1* | 9/2007 | Wang .................... | G10L 15/063 704/257 |
| 2013/0275116 A1* | 10/2013 | Garvin, Jr. ............ | G06Q 30/02 704/2 |
| 2014/0095147 A1* | 4/2014 | Hebert ............... | G06F 16/90332 704/9 |
| 2015/0278192 A1* | 10/2015 | Bretter ................... | G10L 15/00 704/9 |
| 2016/0098393 A1* | 4/2016 | Hebert ................ | G06F 16/3344 704/9 |
| 2016/0104482 A1* | 4/2016 | Aleksic .................. | G10L 19/00 704/235 |
| 2018/0374476 A1* | 12/2018 | Lee ......................... | G06F 3/167 |
| 2020/0143794 A1* | 5/2020 | Beaver ................... | G10L 15/18 |
| 2020/0175963 A1* | 6/2020 | Aleksic ................ | G10L 15/063 |

* cited by examiner

*Primary Examiner* — Jesse S Pullias
(74) *Attorney, Agent, or Firm* — Brian J. Colandreo; Michael T. Abramson; Holland & Knight LLP

(57) ABSTRACT

A method, computer program product, and computer system for identifying, by a computing device, at least one language model component of a plurality of language model components in at least one application associated with automatic speech recognition (ASR) and natural language understanding (NLU) usage. A contribution bias may be received for the at least one language model component. The ASR and NLU may be aligned between the plurality of language model components based upon, at least in part, the contribution bias.

20 Claims, 3 Drawing Sheets

SYSTEM AND METHOD FOR ALIGNING ASR MODEL WEIGHTS WITH NLU CONCEPTS

RELATED CASES

This application claims the benefit of U.S. Provisional Application No. 62/826,426 filed on 29 Mar. 2019, the contents of which are all incorporated by reference.

BACKGROUND

There are a number of use cases common to many automatic speech recognition (ASR) and natural language understanding (NLU) enabled applications. In the normative case, each application must typically build up its behavior, realized in the form of models, or a "data pack," trained from corpora. This modeling is generally ingested at runtime and may enable a recognizer and semantic processor to translate an input signal (e.g., audio or text, respectively) into the expected output representation (e.g., a transcript and/or understood intents and mentions among other data). Repeating the modeling common among these applications is laborious.

BRIEF SUMMARY OF DISCLOSURE

In one example implementation, a method, performed by one or more computing devices, may include but is not limited to identifying, by a computing device, at least one language model component of a plurality of language model components in at least one application associated with automatic speech recognition (ASR) and natural language understanding (NLU) usage. A contribution bias may be received for the at least one language model component. The ASR and NLU may be aligned between the plurality of language model components based upon, at least in part, the contribution bias.

One or more of the following example features may be included. The at least one application may include a pre-trained language model with the at least one language model component of the plurality of language model components. The plurality of language model components may include a general language model component. The plurality of language model components may include a domain specific language model component. The at least one language model component of the plurality of language model components may include a common domain language model component. The at least one application may be configured with the plurality of language model components at run-time through an explicit directive. The at least one application may be configured with the plurality of language model components at run-time through an identifying tuple.

In another example implementation, a computing system may include one or more processors and one or more memories configured to perform operations that may include but are not limited to identifying at least one language model component of a plurality of language model components in at least one application associated with automatic speech recognition (ASR) and natural language understanding (NLU) usage. A contribution bias may be received for the at least one language model component. The ASR and NLU may be aligned between the plurality of language model components based upon, at least in part, the contribution bias.

One or more of the following example features may be included. The at least one application may include a pre-trained language model with the at least one language model component of the plurality of language model components. The plurality of language model components may include a general language model component. The plurality of language model components may include a domain specific language model component. The at least one language model component of the plurality of language model components may include a common domain language model component. The at least one application may be configured with the plurality of language model components at run-time through an explicit directive. The at least one application may be configured with the plurality of language model components at run-time through an identifying tuple.

In another example implementation, a computer program product may reside on a computer readable storage medium having a plurality of instructions stored thereon which, when executed across one or more processors, may cause at least a portion of the one or more processors to perform operations that may include but are not limited to identifying at least one language model component of a plurality of language model components in at least one application associated with automatic speech recognition (ASR) and natural language understanding (NLU) usage. A contribution bias may be received for the at least one language model component. The ASR and NLU may be aligned between the plurality of language model components based upon, at least in part, the contribution bias.

One or more of the following example features may be included. The at least one application may include a pre-trained language model with the at least one language model component of the plurality of language model components. The plurality of language model components may include a general language model component. The plurality of language model components may include a domain specific language model component. The at least one language model component of the plurality of language model components may include a common domain language model component. The at least one application may be configured with the plurality of language model components at run-time through an explicit directive. The at least one application may be configured with the plurality of language model components at run-time through an identifying tuple.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
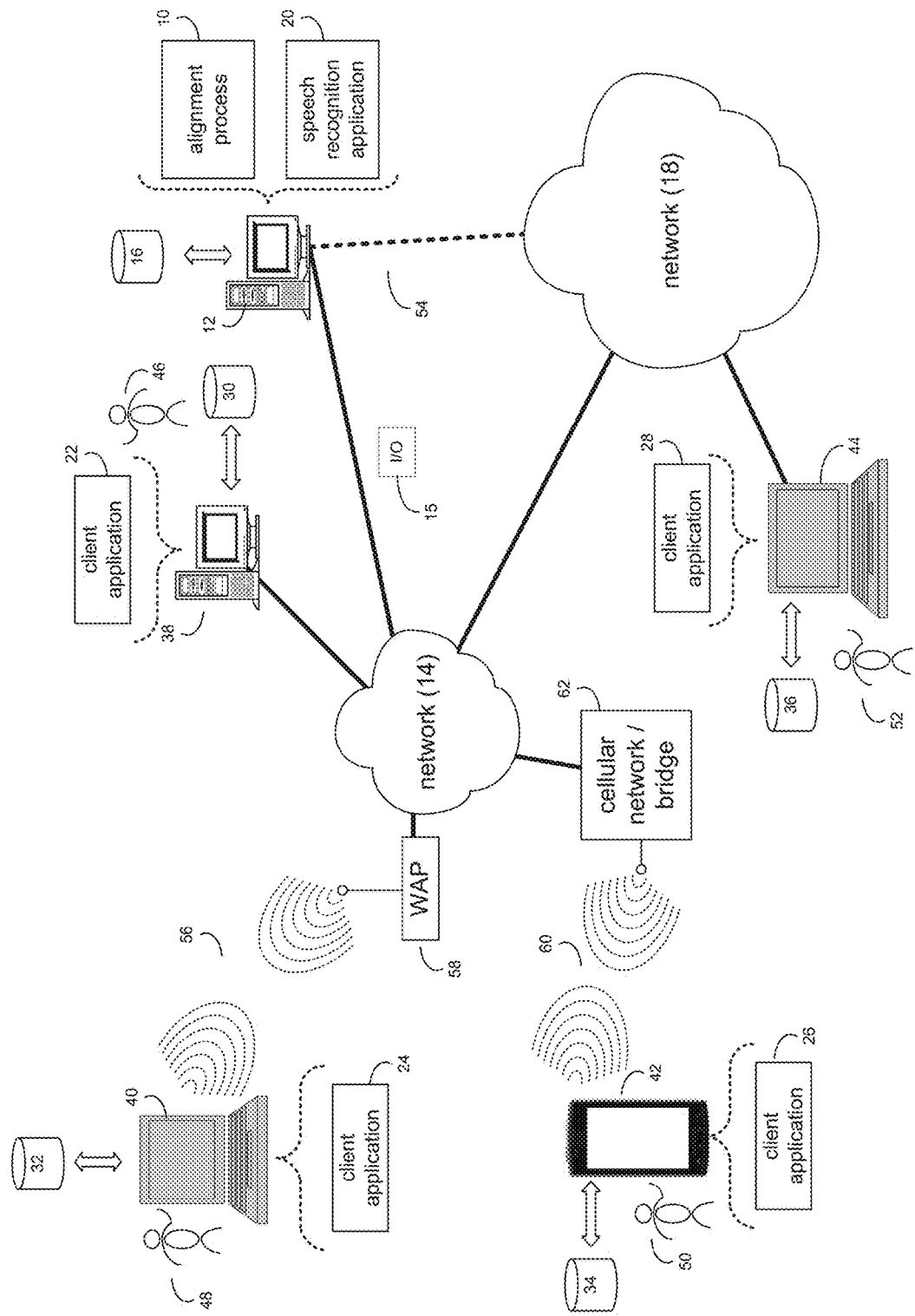
FIG. 1 is an example diagrammatic view of an Alignment process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown an alignment process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an alignment process, such as alignment process 10 of FIG. 1, may identify, by a computing device, at least one language model component of a plurality of language model components in at least one application associated with automatic speech recognition (ASR) and natural language understanding (NLU) usage. A contribution bias may be received for the at least one language model component. The ASR and NLU may be aligned between the plurality of language model components based upon, at least in part, the contribution bias.

In some implementations, the instruction sets and subroutines of Alignment process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, Alignment process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute an automatic speech recognition (ASR) application (e.g., speech recognition application 20), examples of which may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration and/or recognition/translation of spoken language into text by computing devices.

In some implementations, Alignment process 10 and/or speech recognition application 20 may be accessed via one or more of client applications 22, 24, 26, 28. In some implementations, Alignment process 10 may be a standalone application, or may be an applet/application/script/extension that may interact with and/or be executed within speech recognition application 20, a component of speech recognition application 20, and/or one or more of client applications 22, 24, 26, 28. In some implementations, speech recognition application 20 may be a standalone application, or may be an applet/application/script/extension that may interact with and/or be executed within Alignment process 10, a component of Alignment process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of Alignment process 10 and/or speech recognition application 20. Examples of client applications 22, 24, 26, 28 may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration and/or recognition/translation of spoken language into text by computing devices, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of Alignment process 10 (and vice versa). Accordingly, in some implementations, Alignment process 10 may be a purely server-side application, a purely client-side application, or a hybrid server-side/client-side application that is cooperatively executed by one or more of client applications 22, 24, 26, 28 and/or Alignment process 10.

In some implementations, one or more of client applications 22, 24, 26, 28 may be configured to effectuate some or all of the functionality of speech recognition application 20 (and vice versa). Accordingly, in some implementations, speech recognition application 20 may be a purely server-side application, a purely client-side application, or a hybrid server-side/client-side application that is cooperatively executed by one or more of client applications 22, 24, 26, 28 and/or speech recognition application 20. As one or more of client applications 22, 24, 26, 28, Alignment process 10, and speech recognition application 20, taken singly or in any combination, may effectuate some or all of the same functionality, any description of effectuating such functionality via one or more of client applications 22, 24, 26, 28, Alignment process 10, speech recognition application 20, or combination thereof, and any described interaction(s) between one or more of client applications 22, 24, 26, 28, Alignment process 10, speech recognition application 20, or combination thereof to effectuate such functionality, should be taken as an example only and not to limit the scope of the disclosure.

In some implementations, one or more of users 46, 48, 50, 52 may access computer 12 and Alignment process 10 (e.g., using one or more of client electronic devices 38, 40, 42, 44) directly through network 14 or through secondary network 18. Further, computer 12 may be connected to network 14 through secondary network 18, as illustrated with phantom link line 54. Alignment process 10 may include one or more user interfaces, such as browsers and textual or graphical user interfaces, through which users 46, 48, 50, 52 may access Alignment process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
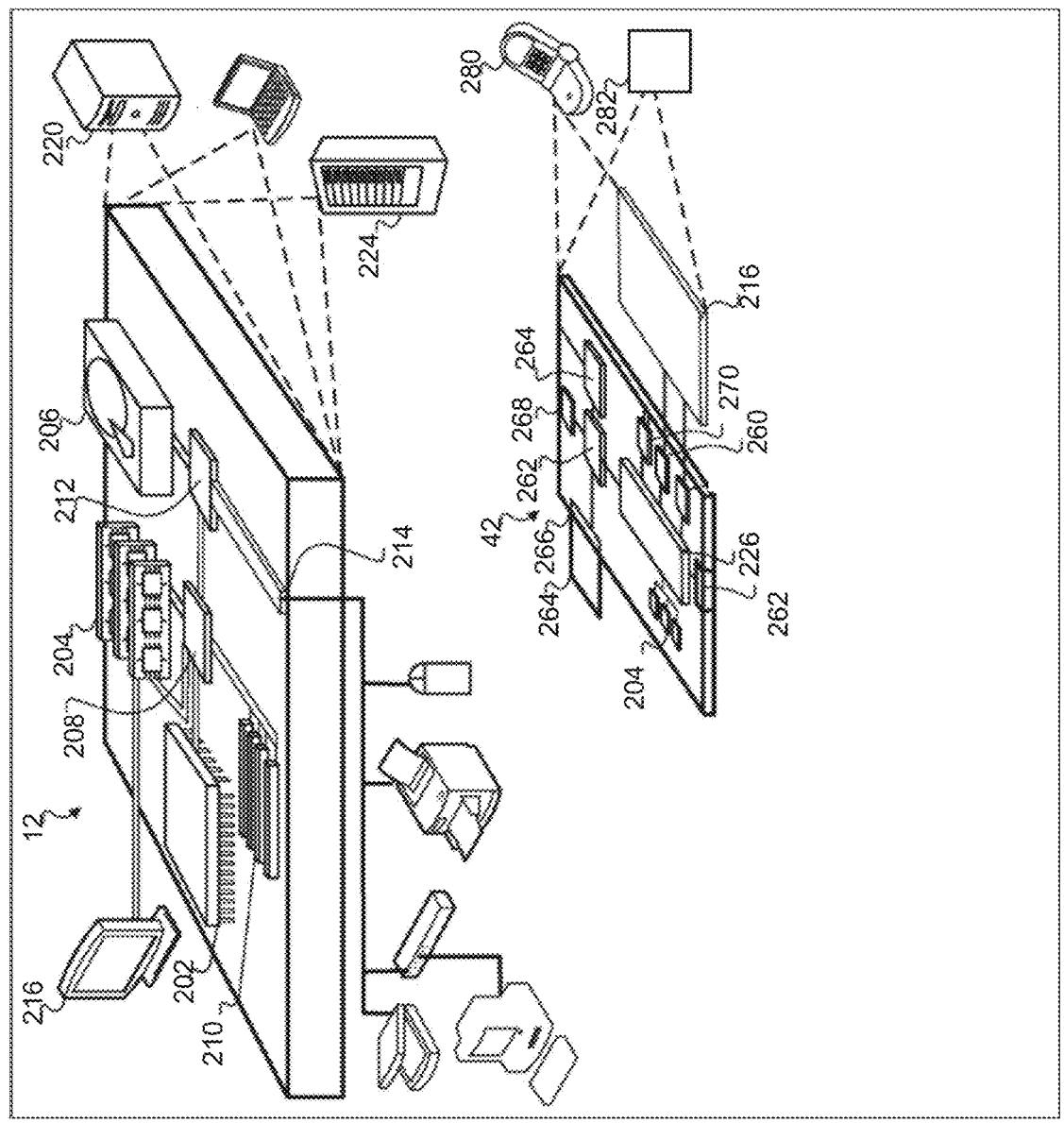
FIG. 2 is an example diagrammatic view of a computer and client electronic device of FIG. 1 according to one or more example implementations of the disclosure.

Referring also to the example implementation of FIG. 2, there is shown a diagrammatic view of computer 12 and client electronic device 42. While client electronic device 42 and computer 12 are shown in this figure, this is for example purposes only and is not intended to be a limitation of this disclosure, as other configurations are possible. Additionally, any computing device capable of executing, in whole or in part, Alignment process 10 may be substituted for client electronic device 42 and computer 12 (in whole or in part) within FIG. 2, examples of which may include but are not limited to one or more of client electronic devices 38, 40, and 44. Client electronic device 42 and/or computer 12 may also include other devices, such as televisions with one or more processors embedded therein or attached thereto as well as any of the microphones, microphone arrays, and/or speakers described herein. The components shown here, their connections and relationships, and their functions, are meant to be examples only, and are not meant to limit implementations of the disclosure described.

In some implementations, computer 12 may include processor 202, memory 204, storage device 206, a high-speed interface 208 connecting to memory 204 and high-speed expansion ports 210, and low speed interface 212 connecting to low speed bus 214 and storage device 206. Each of the components 202, 204, 206, 208, 210, and 212, may be interconnected using various buses, and may be mounted on a common motherboard or in other manners as appropriate. The processor 202 can process instructions for execution within the computer 12, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 204 may store information within the computer 12. In one implementation, memory 204 may be a volatile memory unit or units. In another implementation, memory 204 may be a non-volatile memory unit or units. The memory 204 may also be another form of computer-readable medium, such as a magnetic or optical disk.

Storage device 206 may be capable of providing mass storage for computer 12. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

High speed controller 208 may manage bandwidth-intensive operations for computer 12, while the low speed controller 212 may manage lower bandwidth-intensive operations. Such allocation of functions is exemplary only. In one implementation, the high-speed controller 208 may be coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computer 12 may be implemented in a number of different forms, as shown in the figure. For example, computer 12 may be implemented as a standard server 220, or multiple times in a group of such servers. It may also be implemented as part of a rack server system 224. Alternatively, components from computer 12 may be combined with other components in a mobile device (not shown), such as client electronic device 42. Each of such devices may contain one or more of computer 12, client electronic device 42, and an entire system may be made up of multiple computing devices communicating with each other.

Client electronic device 42 may include processor 226, memory 204, an input/output device such as display 216, a communication interface 262, and a transceiver 264, among other components. Client electronic device 42 may also be provided with a storage device, such as a microdrive or other device, to provide additional storage. Each of the components 226, 204, 216, 262, and 264, may be interconnected using various buses, and several of the components may be mounted on a common motherboard or in other manners as appropriate.

Processor 226 may execute instructions within client electronic device 42, including instructions stored in the memory 204. The processor may be implemented as a chipset of chips that include separate and multiple analog and digital processors. The processor may provide, for example, for coordination of the other components of client electronic device 42, such as control of user interfaces, applications run by client electronic device 42, and wireless communication by client electronic device 42.

In some embodiments, processor 226 may communicate with a user through control interface 258 and display interface 260 coupled to a display 216. The display 216 may be, for example, a TFT LCD (Thin-Film-Transistor Liquid Crystal Display) or an OLED (Organic Light Emitting Diode) display, or other appropriate display technology. The display interface 260 may comprise appropriate circuitry for driving the display 216 to present graphical and other information to a user. The control interface 258 may receive commands from a user and convert them for submission to the processor 226. In addition, an external interface 262 may be provide in communication with processor 226, so as to enable near area communication of client electronic device 42 with other devices. External interface 262 may provide, for example, for wired communication in some implementations, or for wireless communication in other implementations, and multiple interfaces may also be used.

In some embodiments, memory 204 may store information within the Client electronic device 42. The memory 204 can be implemented as one or more of a computer-readable medium or media, a volatile memory unit or units, or a non-volatile memory unit or units. Expansion memory 264 may also be provided and connected to client electronic device 42 through expansion interface 266, which may include, for example, a SIMM (Single In Line Memory Module) card interface. Such expansion memory 264 may provide extra storage space for client electronic device 42, or may also store applications or other information for client electronic device 42. Specifically, expansion memory 264 may include instructions to carry out or supplement the processes described above, and may include secure information also. Thus, for example, expansion memory 264 may be provide as a security module for client electronic device 42, and may be programmed with instructions that permit secure use of client electronic device 42. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 204, expansion memory 264, memory on processor 226, or a propagated signal that may be received, for example, over transceiver 264 or external interface 262.

Client electronic device 42 may communicate wirelessly through communication interface 262, which may include digital signal processing circuitry where necessary. Communication interface 262 may provide for communications under various modes or protocols, such as GSM voice calls, SMS, EMS, or MIMS speech recognition, CDMA, TDMA, PDC, WCDMA, CDMA2000, or GPRS, among others. Such communication may occur, for example, through radio-frequency transceiver 264. In addition, short-range communication may occur, such as using a Bluetooth, WiFi, or other such transceiver (not shown). In addition, GPS (Global Positioning System) receiver module 268 may provide additional navigation and location-related wireless data to client electronic device 42, which may be used as appropriate by applications running on client electronic device 42.

Client electronic device 42 may also communicate audibly using audio codec 270, which may receive spoken information from a user and convert it to usable digital information. Audio codec 270 may likewise generate audible sound for a user, such as through a speaker, e.g., in a handset of client electronic device 42. Such sound may include sound from voice telephone calls, may include recorded sound (e.g., voice messages, music files, etc.) and may also include sound generated by applications operating on client electronic device 42. Client electronic device 42 may be implemented in a number of different forms, as shown in the figure. For example, it may be implemented as a cellular telephone 280. It may also be implemented as part of a smartphone 282, personal digital assistant, remote control, or other similar mobile device.

As noted above, there are a number of use cases common to many automatic speech recognition (ASR) and natural language understanding (NLU) enabled applications. In the normative case, each application must typically build up its behavior, realized in the form of models, or a "data pack," trained from corpora. This modeling is generally ingested at runtime and may enable a recognizer and semantic processor to translate an input signal (e.g., audio or text, respectively) into the expected output representation (e.g., a transcript and/or understood intents and mentions among other data). Repeating the modeling common among these applications is laborious. As such, the present disclosure may advantageously produce an easier and more efficient system by, e.g., replacing duplicate modeling for common use cases with "factory" models for common domains. These factory models, which may be generally referred to as "built-ins," may be formulated by linguistic and modeling experts as part of an ASR+NLU product redistributable.

Figure 3:
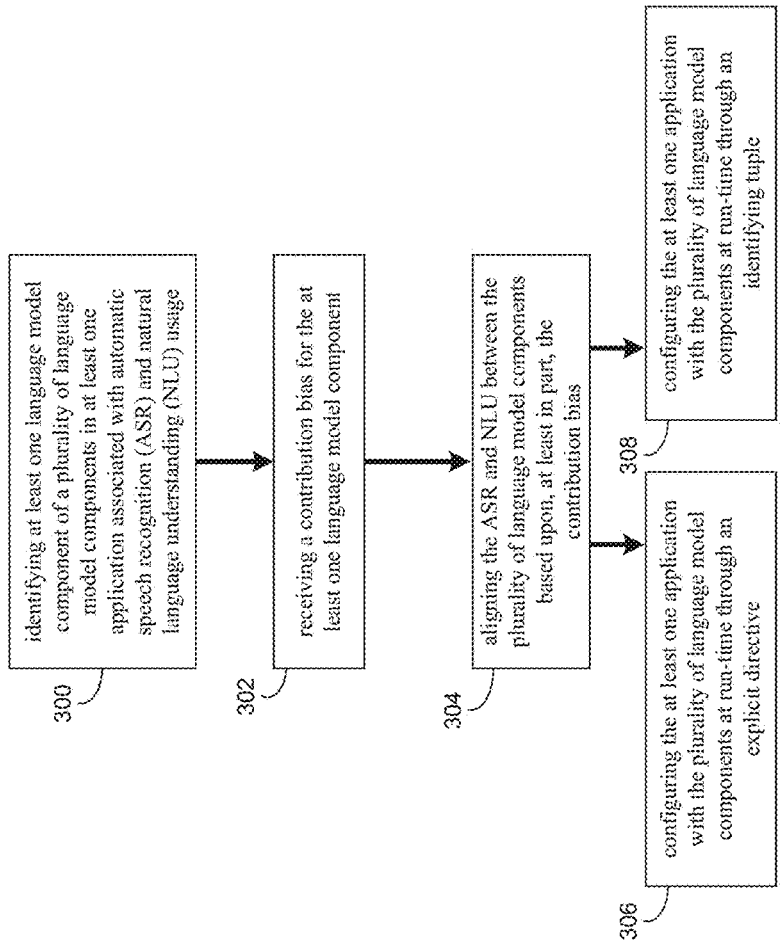
FIG. 3 is an example flowchart of an alignment process according to one or more example implementations of the disclosure.

The Alignment Process:

As discussed above and referring also at least to the example implementations of FIG. 3, alignment process 10 may identify 300, by a computing device, at least one language model component of a plurality of language model components in at least one application associated with automatic speech recognition (ASR) and natural language understanding (NLU) usage. Alignment process 10 may receive 302 a contribution bias for the at least one language model component. Alignment process 10 may align 304 the ASR and NLU between the plurality of language model components based upon, at least in part, the contribution bias.

In some implementations, alignment process 10 may identify 300, by a computing device, at least one language model component of a plurality of language model components in at least one application associated with automatic speech recognition (ASR) and natural language understanding (NLU) usage. For instance, assume for example purposes only that an internal or external user/customer (e.g., user 48) is developing a calendaring application, that is capable of using ASR and NLU to translate an input signal (e.g., user spoken audio/utterances or text, respectively) into the expected output representation (e.g., a transcript and/or understood intents and mentions among other data). In the example, alignment process 10 may identify 300 one or more language model components of a plurality of language model components for the calendaring application. It will be appreciated that while a calendaring application is described, any other application type (e.g., airline reservation application, car part ordering application, Global Positioning System (GPS) direction application, virtual assistant application, etc.) may be used without departing from the scope of the present disclosure. As such, the use of a calendaring application should be taken as example only and not to otherwise limit the scope of the present disclosure.

In some implementations, the at least one application may include a pre-trained language model with the at least one language model component of the plurality of language model components, and in some implementations, the at least one language model component of the plurality of language model components may include a common domain language model component. For example, in some implementations, the ASR model(s) that may be associated with the calendaring application (or any other application type) may be considered a "factory data pack" with common use cases for common domains/tasks (e.g., amount, Boolean, distance, calendar, etc.). These factory models, which may generally be referred to as "built-ins," may be pre-trained and formulated by linguistic and modeling experts as part of an ASR+NLU product redistributable. It will be appreciated that any appropriate technology may be used to create the built-in language models, including, e.g., n-grams, log-linear class models, or deep learning models. Each built-in may model the language with any method appropriate to the domain.

In some implementations, NLU built-ins may allow correct parsing of items like, e.g., Boolean (yes/no), distance, duration, calendar, ordinal numbers, and so forth. These language model component built-ins may provide wide coverage for mention parsing, therefore the grammars (each concept may be represented by grammars, regex and other forms within the data pack) are not restrictive. A language model component built-in may support, e.g., both discrete events, absolute or relative terms and temporal intervals. For example, a calendar event enabled by alignment process 10 may support input in any of the following example and non-limiting forms: "at five pm," "June second," "at three o'clock on Monday," "December twenty," "Monday May fifth," "in three hours," "in two days," "on Christmas," "at five in the morning," "between nine am and seven pm," "from June third to first of July," and so on.

In some implementations, the plurality of language model components may include a general language model component. Generally, a general language model may capture language patterns in the most general sense. It may be trained on data from multiple domains (e.g., blogs, tech reports, news sources, instant messenger chats, etc.) but is not tailored to a specific domain (and thus is not as accurate as a language model trained for a specific domain). A general language model will prefer "recognize speech" over "wreck a nice beach", but when someone says "a lemon", a language model built for the TV domain would prefer the TV channel "LMN". The plurality of language model components may include a domain specific language model component (also referred to as a vertical language model component for specific applications, such as those example applications noted above.

In some implementations, alignment process 10 may receive 302 a contribution bias for the at least one language model component. For instance, user 48 may use a user interface to enter a contribution bias (e.g., a set of weights assigned at run-time to one or more of the above-noted language model components), which may be received 302 by alignment process 10. In some implementations, the weights sum to 1.0 and may be set per utterance, e.g., general=0.4, Boolean=0.5, command_and_control=0.1, etc. Voice commands for controlling things you might traditionally do with buttons e.g., in a car: "cruise control off", "seat position two", or for a TV "volume 10", "TV off" may be examples of command and control language model inputs. Very domain-specific. In some implementations, the ASR language model built-ins may be trained specifically to complement NLU concepts and may also be provided for these same use cases. The user/customer may then have the ability to set the language model weight (contribution bias) for each transaction. For example, if the system prompts the subscriber of the application with "are you sure you want me to book this flight?", the application developer (e.g., user/customer) may be expecting an end-user to say something from the set of Boolean (e.g., yes, yeah, not sure, no, no please don't, etc.) and may bias the language model weight for Boolean to an appropriate value. This may ensure that the application correctly recognizes "no" as opposed to "know" or other similar sounding words, since the application is providing contextual information to the ASR in the form of language model built-in weighting. This is linear interpolation between heterogeneous language models (e.g., n-gram, log-linear class models, feed forward neural networks, recurrent neural networks, LSTM networks, etc.). When a word is requested to be scored that does not exist in one model (because e.g., the output vocabulary differs between the internal models) then each model may have an internally-defined back-off process that is transparently computed for the user.

In some implementations, alignment process 10 may align 304 the ASR and NLU between the plurality of language model components based upon, at least in part, the contribution bias. For example, using the calendar built-in as an example, some example values may include, e.g., "at five pm," "June second," "at three o'clock on Monday," "December twenty," etc. A context-free grammar may be developed for NLU intent and mention recognition. All paths from the context-free grammar may be enumerated to generate text to train the statistical language model. Both the NLU and language models are provided to the customer for (weighted) ASR recognition and pre-built NLU analysis. Because they have been trained on the same data, they are optimized for end-to-end system accuracy in the specified domain. Multiple ASR+NLU built-ins may be provided to the customer to allow the customer to customize the product (application) as they see fit, without collecting or annotating data, and without training their own models. The two components being aligned may include the ASR and NLU; specifically the language model of the ASR. Existing systems often just train one of these systems, or train them in isolation. What is being aligned in the present disclosure are (1) the vocabulary, e.g., both have "IBM" instead of one having "I B M", (2) the coverage of possible sentence structure, e.g., "please transfer about <amount> from checking to savings" where either language model or NLU statistically support "please transfer about" and any variants automatically "transfer about", "transfer", and (3) the coverage of concepts and variants thereof, e.g., duration "two hours after noon on the twentieth day of July". ASR and NLU alignment packaged together with user-controlled selection and weight may enable the benefits and advantages described throughout, such as the ability to choose and weight one or more aligned ASR and NLU built-in models to enable rapid application development.

In some implementations, alignment process 10 may configure 306 the at least one application with the plurality of language model components at run-time through an explicit directive. For example, the application (e.g., via alignment process 10) may be able to describe the specialization (bias contribution of built-ins) desired at run-time through explicit directives (i.e., enable these built-ins with these weights). Support for explicit or the more implicit control may be exposed by the ASR service (associated with alignment process 10) through its Application Programming Interface (API). Implicit control may be seen in the scenario of an application developer choosing a higher level domain (e.g., banking) instead of specific built-ins, and that high-level domain may implicitly select and weigh a set of built-ins. In some implementations, a JSON structure may be passed from the application to the ASR service, to describe which built-ins to enable and how. It will be appreciated that other implementations may also be possible without departing from the scope of the disclosure.

In some implementations, alignment process 10 may configure 308 the at least one application with the plurality of language model components at run-time through an identifying tuple. For example, the application (e.g., via alignment process 10) may be able to describe the specialization (bias contribution of built-ins) desired at run-time through an identifying tuple (which may include a company identifier, an application identifier, user identifier, dialog focus hint and/or other) which the ASR service may use to look up a declarative document (a configuration) against a form of system registry, which it may ingest to understand how best to configure itself for the current subscriber input. It will be appreciated that other implementations may also be possible without departing from the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, at least one language model component of a plurality of language model components in at least one application associated with automatic speech recognition (ASR) and natural language understanding (NLU) usage;
   receiving, from a user via a user interface, a contribution bias for the at least one language model component, the contribution bias comprising a weight entered by the user and assigned to the at least one language model component; and
   aligning the ASR and NLU between the plurality of language model components based upon, at least in part, the contribution bias, wherein aligning the ASR and the NLU includes aligning together vocabulary, coverage of possible sentence structure, and coverage of concepts and variants of the coverage concepts.

2. The computer-implemented method of claim 1 wherein the at least one application includes a pre-trained language model with the at least one language model component of the plurality of language model components.

3. The computer-implemented method of claim 1 wherein the plurality of language model components includes a general language model component.

4. The computer-implemented method of claim 1 wherein the plurality of language model components includes a domain specific language model component.

5. The computer-implemented method of claim 1 wherein the at least one language model component of the plurality of language model components includes a common domain language model component.

6. The computer-implemented method of claim 1 further comprising configuring the at least one application with the plurality of language model components at run-time through an explicit directive.

7. The computer-implemented method of claim 1 further comprising configuring the at least one application with the plurality of language model components at run-time through an identifying tuple.

8. A computer program product residing on a non-transitory computer readable storage medium having a plurality of instructions stored thereon which, when executed across one or more processors, causes at least a portion of the one or more processors to perform operations comprising:
   identifying at least one language model component of a plurality of language model components in at least one application associated with automatic speech recognition (ASR) and natural language understanding (NLU) usage;
   receiving, from a user via a user interface, a contribution bias for the at least one language model component, the contribution bias comprising a weight entered by the user and assigned to the at least one language model component; and
   aligning the ASR and NLU between the plurality of language model components based upon, at least in part, the contribution bias, wherein aligning the ASR and the NLU includes aligning together vocabulary, coverage of possible sentence structure, and coverage of concepts and variants of the coverage concepts.

9. The computer program product of claim 8 wherein the at least one application includes a pre-trained language model with the at least one language model component of the plurality of language model components.

10. The computer program product of claim 8 wherein the plurality of language model components includes a general language model component.

11. The computer program product of claim 8 wherein the plurality of language model components includes a domain specific language model component.

12. The computer program product of claim 8 wherein the at least one language model component of the plurality of language model components includes a common domain language model component.

13. The computer program product of claim 8 wherein the operations further comprise configuring the at least one application with the plurality of language model components at run-time through an explicit directive.

14. The computer program product of claim 8 wherein the operations further comprise configuring the at least one application with the plurality of language model components at run-time through an identifying tuple.

15. A computing system including one or more processors and one or more memories configured to perform operations comprising:
   identifying at least one language model component of a plurality of language model components in at least one application associated with automatic speech recognition (ASR) and natural language understanding (NLU) usage;
   receiving, from a user via a user interface, a contribution bias for the at least one language model component, the contribution bias comprising a weight entered by the user and assigned to the at least one language model component; and aligning the ASR and NLU between the plurality of language model components based upon, at least in part, the contribution bias, wherein aligning the ASR and the NLU includes aligning together vocabulary, coverage of possible sentence structure, and coverage of concepts and variants of the coverage concepts.

16. The computing system of claim 15 wherein the at least one application includes a pre-trained language model with the at least one language model component of the plurality of language model components.

17. The computing system of claim 15 wherein the plurality of language model components includes a general language model component.

18. The computing system of claim 15 wherein the plurality of language model components includes a domain specific language model component.

19. The computing system of claim 15 wherein the at least one language model component of the plurality of language model components includes a common domain language model component.

20. The computing system of claim 15 wherein the operations further comprise configuring the at least one application with the plurality of language model components at run-time through one of an explicit directive and an identifying tuple.

* * * * *